United States Patent

[11] 3,626,282

[72] Inventor Sherman Theodore Brewer
Little Silver, N.J.
[21] Appl. No. 15,520
[22] Filed Mar. 2, 1970
[45] Patented Dec. 7, 1971
[73] Assignee Bell Telephone Laboratories Incorporated
Murray Hill, N.J.

[54] METHOD FOR LOCATING SHUNT FAULTS IN A CABLE UTILIZING THE FAULT AS A NOISE SOURCE
6 Claims, 2 Drawing Figs.

[52] U.S. Cl. 324/52, 179/175.3
[51] Int. Cl. G01r 31/08
[50] Field of Search 324/52; 179/175.3, 175.31

[56] References Cited
UNITED STATES PATENTS
2,580,097 12/1951 Ilgenfritz et al. 179/175.31

*Primary Examiner*—Gerard R. Strecker
*Attorneys*—R. J. Guenther and William L. Keefauver

ABSTRACT: Shunt faults are located in a communications cable by turning to account the noise properties of the fault. Bias power supplied to a cable is adjusted to maximize the noise generated at the fault. Noise measurements are made at each of the cable terminals at predetermined frequencies. The noise measurements are utilized in conjunction with the preestablished transmission levels in the cable to obtain a measure of the distance to the fault from a cable terminal.

INVENTOR
BY S. T. BREWER
A. E. Hirsch Jr.
ATTORNEY

METHOD FOR LOCATING SHUNT FAULTS IN A CABLE UTILIZING THE FAULT AS A NOISE SOURCE

This invention relates to the location of faults in cable systems and more particularly to methods of locating shunt faults in telephone cables

BACKGROUND OF THE INVENTION

Many systems and methods for locating faults in telephone cables and the like are known in the art. Most of them, however, utilize complex equipment in attempting to locate accurately the position of cable faults. For example, pulse-echo techniques and complex wave-analysis techniques have been utilized. Despite the use of these complex systems, precise location of shunt faults, particularly those known to occur in submarine telephone cables, has not been realized.

SUMMARY OF THE INVENTION

It is, therefore, an object of this invention to improve shunt fault locating methods.

It is another object of this invention to simplify the techniques of locating shunt faults in telephone cables.

It is a further object of the invention to locate shunt faults within a section of a repeatered cable utilizing a minimum of additional equipment.

In accordance with this invention, these and other objects are accomplished in locating shunt faults in a telephone cable by turning to account the properties of the fault itself. Important among these is the fact that a shunt fault in a cable can be made to generate broadband noise having components in the cable signal transmission bands. In accordance with this invention, bias power supplied to the cable having a shunt fault is adjusted until the noise power generated at the fault is maximized. Then, first and second noise power measurements are made at first and second terminals, respectively, of the cable. The bias power supplied to the cable is then adjusted to minimize the noise power generated at the fault. Under the minimum noise condition, third and fourth noise measurements are taken at the first and second cable terminals, respectively. The measured noise values and the known propagation losses, i.e., transmission levels, in the cable, are representative of the location of the shunt fault. Additionally, these values, i.e., noise power and propagation loses may be utilized in accordance with a preestablished relationship as a measure of the location of the shunt fault between predetermined locations along the cable.

These and other objects and advantages of the invention will be more fully understood from the following detailed description taken in connection with the appended drawings.

DETAILED DESCRIPTION

Figure 1:
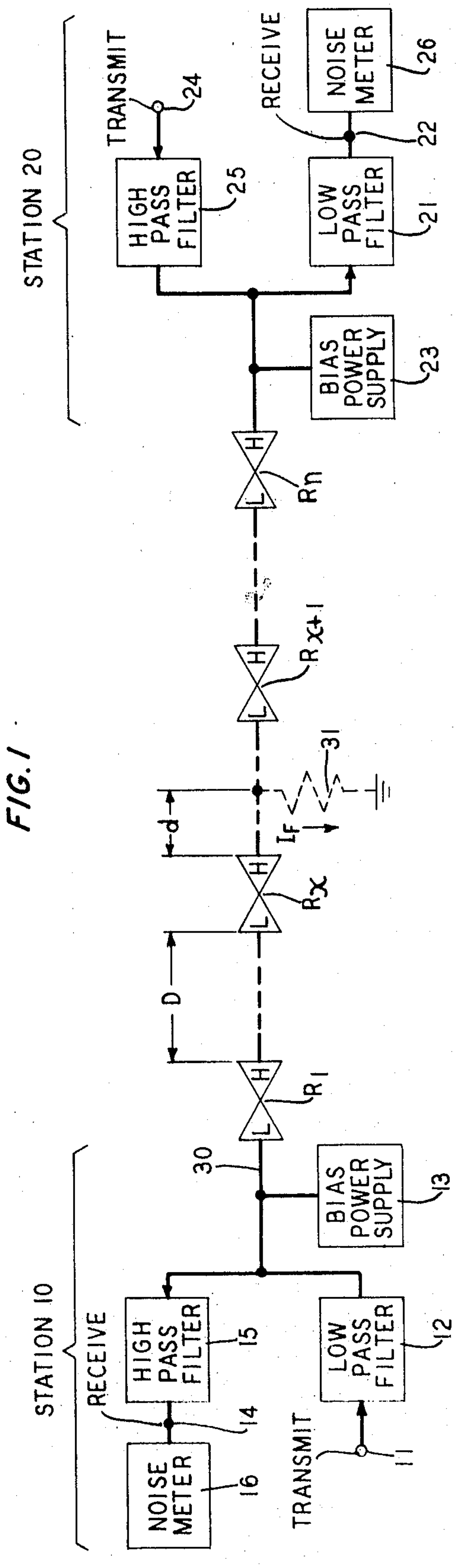
FIG. 1 depicts in simplified form a telephone cable system including apparatus which may be used in the practice of the invention.

FIG. 1 depicts in simplified from a telephone cable system in which the invention may be practiced. The cable system is typical of those utilized in transoceanic communication systems. Such systems may include a "near-end" station 10 and a "far-end" station 20. Information is transmitted and received over a common cable 30 by way of a plurality of frequency bands. Thus, appropriate filters are utilized at the individual stations to separate the transmit and receive frequency bands. For example, low-pass filter 12 and high-pass filter 15 are employed at station 10, and low-pass filter 21 and high-pass filter 25 are used at station 20. Noise meters 16 and 26 coupled to receive terminals 14 and 22, respectively, are utilized in practicing the invention.

Cable 30, connecting station 10 to station 20, includes a plurality of repeaters $R_1$ through $R_n$ for amplifying the transmitted signals in a well-known fashion. Power for the repeaters is supplied to cable 30 from bias power supplies 13 and 23. Repeaters $R_1$ through $R_n$ are spaced along cable 30 at predetermined intervals. Spacing interval D is usually fixed for a given cable system and may, for example, be from 10 to 30 nautical miles in length.

For purposes of illustrating the invention, cable 30 as shown in FIG. 1 includes high-impedance shunt fault 31. Fault 31 is located somewhere between repeater $R_x$ and repeater $R_{x+1}$ at a distance $d$ from $R_x$. Such a fault may result from numerous causes, typical of which is a break or crack in a cable causing leakage to the sea water.

Many systems are known in the art which may be utilized for determining which cable section is faulted. That is, it may be determined in numerous ways that a fault exists somewhere between repeaters $R_x$ and $R_{x+1}$. Typically, the supervisory tones in the repeaters are used for this purpose in a manner well known in the art. The problem, however, is not only to locate which cable section includes the fault but to locate accurately the position of fault 31 between repeaters $R_x$ and $R_{x+1}$, namely, to determine distance $d$ (FIG 1).

This is accomplished by turning to account a property of high-impedance shunt faults namely, that the fault itself may be made to emit broadband noise having components in the cable transmission frequency bands. Thus, in accordance with the invention, fault 31 is caused to generate broadband noise by adjusting bias power to the cable via supplies 13 and 23. Supplies 13 and 23 are selectively adjusted until a "maximum" or otherwise measurable noise power indication is obtained on either noise meter 16 or noise meter 26. Ten under the maximum fault noise condition, noise power measurements are taken at predetermined frequencies at stations 10 and 20 by utilizing noise meters 16 and 26 coupled to receive terminals 14 and 22, respectively. In an example from practice, the predetermined frequencies used in making the noise measurements were 2.0 MHz. for the lowband frequency and 5.5 MHz. for the highband frequency. Ideally, it would be preferred that both noise measurements be made at the same frequency in order to minimize possible measurement errors. In practice, however, the choice of frequencies used is limited because of the frequency separation between the high and low transmission bands used in the cable system.

Figure 2:
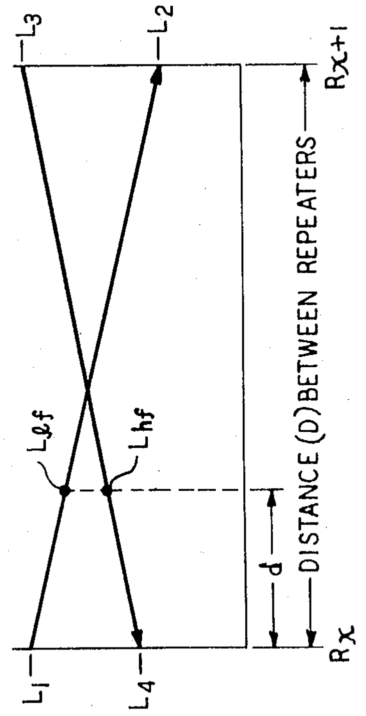
FIG. 2 is a graphical representation useful in describing the operation of the invention

After the noise power measurements have been made under the maximum fault noise conditions, cable bias power is again adjusted via supplies 13 and 23 to minimize the noise generated at fault 31. In practice, the bias power is adjusted so that no current flows through fault 31. Under the "Minimum" fault noise condition, noise power measurements are again taken, using noise meters 16 and 26 at stations 10 and 20, respectively. The minimum fault noise power measurements provide a background noise indication and actually can be made on an unfaulted system to be utilized later in determining the location of faults, e.g., fault 31.

the measured fault noise power values in conjunction with the preestablished propagation losses i.e., transmission levels for the two transmission bands represent the location of fault 31 within the faulted cable section. The transmission levels are oppositely sloped functions of the distance between repeaters $R_x$ and $R_{x+1}$ as depicted in FIG. 2.

In order to simplify and clarify the description of the invention, it is useful to define certain terms. Accordingly:

"$P_f$" is the maximum noise injected into the system at fault 31;

"$P_a$" and "$P_b$" are noise power readings at a predetermined frequency in the low-frequency transmission band taken with noise meter 26 under the minimum and maximum fault noise conditions, respectively;

"$P_c$" and "$P_d$" are noise power readings at a predetermined frequency in the high-frequency transmission band taken with noise meter 16 under the minimum and maximum fault noise conditions, respectively;

"$P_1$" is the noise power component of "$P_a$" indicated on meter 26 due to "$P_f$" injected at fault 31;

"$P_h$" is the noise power component of "$P_d$" indicated on meter 16 due to "$P_f$" injected at fault 31;

"$L_1$" is the signal transmission level in the low-frequency transmission band at repeater $R_x$;

"$L_2$" is the signal transmission level in the low-frequency transmission band at repeater $R_{x+1}$;

"$L_4$" is the signal transmission level in the high-frequency transmission band at repeater $R_x$;

"$L_3$" is the signal transmission level in the high-frequency transmission band at repeater $R_{x+1}$;

"$L_{lf}$" is the signal transmission level in the low-frequency transmission band at fault 31; and "$L_{hf}$" is the signal transmission level in the high-frequency transmission band at fault 31.

Thus in operation, noise power measurements are taken as described above for $P_a$, $P_b$, and $P_c$ and $P_d$. Then the noise power quantities $P_1$ and $P_h$ are determined as follows:

$$P_1=P_b-P_a, \text{ and} \qquad (1)$$

$$P_h=P_d-P_c^{\circ} \qquad (2)$$

Once $P_1$ and $P_h$ have been determined (and expressed in "dBmo", i.e., relating the measured values to the standard power level of 1 milliwatt), they are expressed as $$P_1=P_f-L_{lf}, \text{ and} \qquad (3)$$

$$P_h=P_f-L_{hf}. \qquad (4)$$

Referring to FIG. 2, the transmission levels in the low- and high-frequency bands at fault 31, namely $L_{lf}$ and $L_{hf}$ respectively, may be expressed as $$L_{lf}=L_1+d/D(L_1-L_2), \text{ and} \qquad (5)$$

$$L_{hf}=L_4-d/D(L_3-L_4). \qquad (6)$$

Then, substituting the expressions of equations (5) and (6) for $L_{lf}$ and $L_{hf}$, respectively, into equations (3) and (4) and solving the resulting equations simultaneously yields $$d=D\,\frac{P_1-P_h+L_1-L_4}{L_1-L_2+L_3-L_4}. \qquad (7)$$

Equation (7) yields distance $d$ to fault 31 in cable section ($x$+1) as desired.

In an example from practice, shunt fault 31 (FIG. 1) is located by first adjusting the power supplied to cable 30 via bias power supplies 13 and 23, so that no current flows through fault 31. Noise power measurements $P_a$=0.158 picowatts (pW.) taken on noise meter 26 at a frequency of 2.0 MHz. and $P_c$=0.141 pW. taken on noise meter 16 at a frequency of 5.5 MHz., represent the minimum noise power in the low- and high-frequency bands, respectively. The cable bias power was then adjusted so that approximately 9 milliamperes of current flowed through fault 31. This represents the "maximum" fault noise condition. Power measurements $P_d$=1.458 pW. taken on meter 26 at 2 MHz. and $P_d$=10.0 pW. taken at 5.5 MHz. on meter 16 represent the maximum fault noise in the low- and high-frequency bands, respectively. Substitution of the measured noise power values in equations (1) and (2) yields $P_1$=1.3 pW. and $P_h$=9.86 pW. Conversion of the $P_1$ and $P_h$ values to dBmo, i.e., relating the measured values to the standard power level of 1 milliwatt, gives $P_1$=−88.86 dB and $P_h$=−80.06 dB. The propagation loss (FIG. 2) in a section of cable at 2.0 MHz., i.e, ($L_1-L_2$) is 22.7 dB and the propagation loss at 5.5 MHz., i.e., ($L_3-L_4$) is 38.2 dB. It is also known from practice that ($L_1-L_4$) is 29.2 dB. Substitution of the known propagation loss values and the measured noise power values into equation (7) yields, for a repeater separation D of 10 nautical miles, distance $d$ of 3.2 nautical miles to fault 31 from repeater $R_x$.

What is claimed is:

1. A method for locating shunt faults in a transmission cable system having preestablished transmission levels comprising the steps of, adjusting power supplied to the cable to maximize noise power generated at a shunt fault, making a first noise power measurement during said maximum noise condition at a first predetermined location along said cable, making a second noise power measurement during said maximum noise condition at a second predetermined location along said cable, and utilizing said first and second measured noise power values in conjunction with said preestablished transmission values as a measure of the position of the fault between said first and second locations.

2. The method as defined in claim 1 further including the steps of, adjusting the power supplied to said cable to minimize noise power generated at said fault, making a third noise power measurement during said minimum noise condition at said first location along said cable, making a fourth noise power measurement during said minimum noise condition at said second location along said cable, and utilizing said third and fourth noise power measurements in conjunction with said first and second noise power measurements and said preestablished transmission levels as a measure of the position of said fault between said first and second predetermined locations along said cable.

3. A method as defined in claim 2 wherein said first and second locations are first and second terminals of the cable, respectively, and wherein said first and third noise power measurements are made at a first predetermined frequency and said second and fourth noise power measurements are made at a second predetermined frequency, said frequencies being in the transmission passbands of said cable.

4. The method as defined in claim 3 wherein said transmission levels and said noise measurement values represent the position of the fault from said first terminal in accordance with the relationship $$d=D\,\frac{P_1-P_h+L_1-L_4}{L_1-L_2+L_3-L_4}.$$

where $D$ is the distance in nautical miles between the cable terminals, $d$ is the distance in nautical miles from the first terminal to the fault, $P_1$ is the net noise power in the first frequency band measured at said first cable terminal due to the fault (the first noise power measurement minus the third noise power measurement), $P_h$ is the net noise power in the second frequency band measured at said second cable terminal due to the fault (the second noise power measurement minus the fourth noise power measurement), $L_1$ and $L_2$ are the cable transmission power levels in the first frequency band at the first and second terminals, respectively, and $L_3$ and $L_4$ are the cable transmission power levels in the second frequency band at the second and first terminals respectively.

5. A method for locating shunt faults in a communication cable system including a plurality of equally spaced repeaters, each repeater having preestablished signal transmission power levels in first and second frequency bands, comprising the steps of, adjusting the bias power supplied to the cable to minimize noise power generated at a fault, making a first noise power measurement during said minimum fault noise condition at a first predetermined frequency at a first terminal of said cable, making a second noise power measurement during said minimum fault noise condition at a second predetermined frequency at a second terminal of said cable, said second frequency being related to said first frequency by the frequency spacing between the first and second frequency bands, adjusting the bias power supplied to the cable to maximize noise power generated at the fault, making a third noise power measurement during said maximum fault noise condition at said first terminal, making a fourth noise power measurement during said maximum noise condition at said second predetermined frequency at said second terminal, and utilizing said measured noise power values in conjunction with said preestablished transmission levels as a measure of the position of the fault between two adjacent repeaters.

6. The method as defined in claim 5 wherein said transmission power levels and said measured noise power values represent the position of the fault in a cable section between first and second successive repeaters in accordance with the relationship $$d=D\,\frac{P_1-P_h+L_1-L_4}{L_1-L_2+L_3-L_4},$$

where $D$ is the distance in nautical miles between the successive repeaters, $d$ is the distance in nautical miles from the first repeater to the fault, $P_1$ is the net noise power in the first frequency band due to the fault measured at the first cable terminal (third noise power measurement minus first noise power measurement), $P_h$ is the net noise power in the second frequency band due to the fault measured at the second cable terminal (the fourth noise power measurement minus the second noise power measurement), $L_1$ and $L_2$ are the cable transmission power levels in the first frequency band at the first and second repeaters, respectively, and $L_3$ and $L_4$ are the cable transmission power levels in the second frequency band at the second and first repeaters, respectively.

* * * * *